Jan. 21, 1958     W. GRATTIDGE     2,820,727
METHOD OF METALLIZING CERAMIC BODIES
Filed May 22, 1956

Inventor:
Walter Grattidge,
by Richard R. Brainard
His Attorney.

2,820,727
METHOD OF METALLIZING CERAMIC BODIES

Walter Grattidge, Schenectady, N. Y., assignor to General Electric Company, a corporation of New York Application May 22, 1956, Serial No. 586,404

6 Claims. (Cl. 117—217)

My invention relates to an improved method of forming a tightly adhering metal surface on a non-metallic refractory body and more particularly to an improved method of applying a platinum or iridium coating to an alumina-containing ceramic body.

The production of tightly adhering metal coatings on a non-metallic refractory body has been a continuing problem. In recent years, methods of producing such coatings have been developed and applied commercially with considerable success. In certain applications, however, it has been difficult to obtain metallic coatings having the desired characteristics, particularly where both mechanical and electrical connections are desired and where high operating temperatures are encountered. As a specific example it has been difficult to provide suitable metal electrodes or contacts for temperature sensitive resistance material adapted for operation at temperatures of the order of 800° to 1200° C.

Such temperature responsive resistance materials may, for example, be in the form of alumina-containing ceramic bodies, such as disks or rods, and my invention relates particularly to the formation of a tightly adhering coating of platinum or iridium on such bodies by means of an intermediate layer which bonds to the ceramic and wets the overlying metal. Specifically the intermediate layer consists essentially of a mixture of iron oxide and alumina. The percentage of iron oxide is not highly critical but percentages by weight of iron oxide to the total iron oxide-alumina mixture of 10% reduces the temperature at which the coated ceramic must be fired to something in the order of 1400° C. At percentages below 10%, the required firing temperature increases and with percentages substantially less than 10%, the platinum or iridium fails to provide a homogeneous coating over the interlayer. The percentage of iron oxide may constitute as much as 70% by weight of the iron oxide-alumina mixture with somewhat lower firing temperatures being possible with the higher iron oxide percentages. Chromium oxide may be used instead of iron oxide with very similar results.

It is an object of my invention to provide a new and improved method of providing a tightly adhering metal coating to a ceramic body.

It is another object of my invention to provide an improved method of applying a metal coating to a ceramic body which adheres well at high operating temperatures and provides good mechanical and electrical connection with the ceramic.

Figure 1:
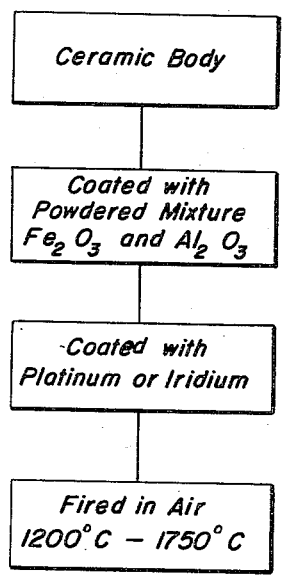

Further objects and advantages of my invention will become apparent from the following description of specific examples thereof taken in connection with the accompanying drawing and its scope will be pointed out in the appended claims. In the drawing, Fig. 1 is a block diagram illustrating the successive steps of my improved method, and Fig. 2 is an elevational view of a temperature responsive resistance element having metal contacts applied thereto by my improved method.

Figure 2:
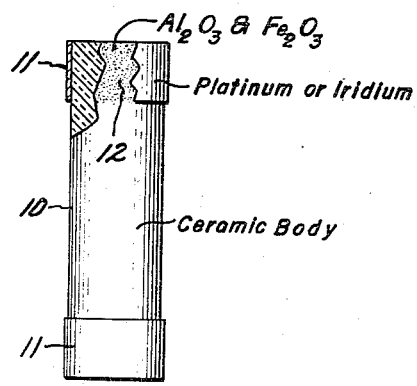

In accordance with one specific example of my method, a non-metallic refractory body which may be in the form of a rod of alumina ceramic as shown in Fig. 2 is provided at the ends thereof with metal contacts 11 by first painting the areas to be coated with a layer 12 of a suspension consisting essentially of iron oxide and alumina in a suitable binder, such as polyvinyl alcohol, nitrocellulose or glycerine. While, as indicated above, the iron oxide may constitute from 10 to 70% by weight of the iron oxide-alumina mixture, good results have been produced in the specific example here described by utilizing a mixture including 20% by weight of the iron oxide. Preferably, more than one layer is applied to build up a small percentage of the iron oxide-alumina mixture which in the later firing operation bonds to the ceramic and wets the metal. While the metal, specifically platinum or iridium, may be applied in a suitable binder, such as mentioned above, I have found it very desirable to utilize a small percentage of the iron oxide-alumina mixture and the binder to make a paste. For example, such a mixture in which the platinum is 75% by weight of the total mixture is used. One or more coatings of this suspension is applied over the oxide layer and the resultant coated body then air-fired at a temperature and for a time dependent on the percentage of iron oxide employed. As an alternative, other oxygen-bearing atmospheres may be used. With the specific percentages in this example, good results are obtained with a temperature of 1500° C. for one-half hour. If platinum is the metal employed, the temperature should be kept under 1600° C. and if iridium is employed as the metal, the temperature should be kept under 1750° C. With higher iron oxide percentages, the firing temperature may be in the order of 1200° C.

While the invention is useful in connection with high alumina ceramics generally, it is particularly useful in connection with high temperature resistance elements, such as provided by an alumina body having a composition of 95% to 75% $Al_2O_3$ and 5% to 25% $Fe_2O_3$ or $Cr_2O_3$. In the particular example given above, the rod 10 had a composition of 80% $Al_2O_3$ and 20% $Fe_2O_3$.

The firing time of one-half hour is not critical and may be reduced, particularly as the temperature is increased. Also as temperatures below 1500° C. are used, the firing time may tend to be longer to provide adequate bonding between the oxide layer and the ceramic body.

In carrying out my invention with chromium oxide ($Cr_2O_3$) the same procedure as outlined in connection $Fe_2O_3$ is followed. For a given percentage of chromium oxide in the chromium oxide alumina mixture, either the firing temperature or the firing time is slightly increased as compared with $Fe_2O_3$-alumina mixture. Since the maximum firing temperature with platinum is about 1600° C. the firing time may be suitably increased. For example with a 20% chromium oxide alumina mixture and a platinum outer layer, firing at about 1500° C. for forty-five minutes is satisfactory.

A modified form of my invention may be employed when utilizing ceramics during their initial production, that is, before they have been fired. In such a modification, the alumina iron oxide and platinum may be pressed into the surface of the ceramic body at the time that it is formed. Thereafter the firing of the body is effective to form the tightly adhering metal coating on the ceramic body. The percentages of the iron oxide and alumina used may be selected in accordance with the same considerations as described above in connection with the first embodiment of my invention in which the iron oxide may be varied over the range of 10% to 70% by weight of the mixture. Also the firing temperatures and time will be selected in accordance with the previously discussed considerations but also taking into account the requirements of the particular ceramic involved.

The metal coatings formed in accordance with my invention are of substantial thickness and may be smoothed down to provide better surfaces for electrical contact by buffing or polishing with a suitable abrasive without destroying the continuity of the coating. The surface resistance of such a coating before or after buffing is negligible.

I have found that metal coatings formed in accordance with my method are capable of withstanding high operating temperatures while maintaining good electrical contact with the refractory body. This is particularly important in connection with temperature sensitive resistance elements which are utilized as control or measuring devices.

What I claim as new and desire to secure by Letters Patent is:

1. The method of forming a metal surface on a refractory body having a high alumina content which comprises applying to said body one or more layers consisting essentially of a mixture of alumina and an oxide selected from the group consisting of $Fe_2O_3$ and $Cr_2O_3$, the alumina constituting from 30% to 90% by weight of the mixture and then applying a layer of metal selected from the group consisting of platinum and iridium and heating the coated body in an oxygen containing atmosphere to a temperature from 1200° C. to 1600° C. for platinum and from 1200° C. to 1750° C. for iridium to cause said oxide-alumina coating to react with said body and form a bond between said body and the applied layer of metal.

2. The method of forming a metal surface on a refractory body having a high alumina content which comprises applying to said body one or more layers consisting essentially of a mixture of iron oxide and alumina, the alumina constituting from 30 to 90% by weight of the mixture and then applying a layer of a metal consisting essentially of platinum or iridium to the coated area and heating the coated body in air to a temperature of 1200° C. to 1600° C. to cause said iron oxide-alumina coating to react with said body and form a bond between said body and the metal surface.

3. The method of forming a metal surface on a refractory body having a high alumina content which comprises applying to said body one or more layers consisting essentially of a mixture of iron oxide and alumina, the iron oxide constituting approximately 20% by weight of the mixture, and then applying a layer of a metal consisting essentially of platinum to the coated area and heating the coated body in air to a temperature of about 1500° C. for approximately 30 minutes to cause said iron oxide-alumina coating to react with said body and form a bond between said body and the platinum coating.

4. The method of forming a metal surface on a refractory body having a high alumina content which comprises applying to said body one or more layers consisting essentially of a mixture of iron oxide and alumina, the iron oxide constituting approximately 20% by weight of the mixture, and then applying a layer of a metal consisting essentially of platinum to the coated area and heating the coated body in air to a temperature of 1200° C. to 1600° C. to cause said iron oxide-alumina coating to react with said body and form a bond between said body and the platinum coating.

5. The method of forming a metal surface on a refractory body having a high alumina content which comprises applying to said body one or more layers consisting essenially of a mixture of iron oxide and alumina, the alumina constituting from 30 to 90% by weight of the mixture and then applying a layer of a metal consisting essentially of iridium to the coated area and heating the coated body in air to a temperature of 1200° C. to 1750° C. to cause said iron oxide-alumina coating to react with said body and form a bond between said body and the iridium coating.

6. The method of forming a metal surface on a refractory body consisting essentially of 95% to 75% $Al_2O_3$ and 5% to 25% of an oxide selected from the group consisting of $Fe_2O_3$ and $Cr_2O_3$ which comprises applying to said body one or more layers consisting essentially of a mixture of $Fe_2O_3$ and $Al_2O_3$ and then applying a layer of a metal consisting essentially of a metal selected from the group consisting of platinum and iridium to the coated area and heating the coated body in air to a temperature from 1200° C. to 1600° C. for platinum and from 1200° C. to 1750° C. for iridium to cause said iron oxide-alumina coating to react with said body and form a bond between said body and the metal coating.

References Cited in the file of this patent

UNITED STATES PATENTS

| | | |
|---|---|---|
| 2,328,101 | Rosenblatt | Aug. 31, 1943 |
| 2,619,432 | Hosmer | Nov. 25, 1952 |
| 2,645,701 | Kerridge et al. | July 14, 1953 |
| 2,647,218 | Sorg et al. | July 28, 1953 |